United States Patent [19]

Kohmoto

[11] Patent Number: 5,420,656

[45] Date of Patent: May 30, 1995

[54] LIGHT INTERCEPTING APPARATUS OF MOVABLE LENS BARREL

[75] Inventor: Shinsuke Kohmoto, Tokyo, Japan

[73] Assignee: Asahi Kogaku Kogyo Kabushiki Kaisha, Tokyo, Japan

[21] Appl. No.: 136,140

[22] Filed: Oct. 15, 1993

[30] Foreign Application Priority Data

Oct. 19, 1992 [JP] Japan .................. 4-072728 U

[51] Int. Cl.⁶ ............................................ G03B 1/18
[52] U.S. Cl. ................................. 354/195.1; 359/813
[58] Field of Search ............... 354/195.1, 195.12, 286, 354/288; 359/813, 823, 826, 611, 694

[56] References Cited

U.S. PATENT DOCUMENTS

| | | | |
|---|---|---|---|
| 4,911,542 | 3/1990 | Nishio et al. | 359/701 |
| 4,944,030 | 7/1990 | Haraguchi et al. | 354/195.12 X |
| 5,033,819 | 7/1991 | Tanaka | 359/823 |
| 5,034,762 | 7/1991 | Kohmoto | 354/195.12 |
| 5,115,350 | 5/1992 | Tanaka | 359/823 |
| 5,289,318 | 2/1994 | Sekine et al. | 359/813 |

FOREIGN PATENT DOCUMENTS 63-30837  2/1988  Japan .
5-31634   8/1993  Japan .

*Primary Examiner*—Howard B. Blankenship
*Attorney, Agent, or Firm*—Sandler, Greenblum & Bernstein

[57] ABSTRACT

A light intercepting apparatus of a lens barrel is provided having a movable lens barrel which moves along an optical axis of the lens barrel, and an annular light intercepting member that elastically contacts an outer peripheral surface of the movable lens barrel. At least the portion of the annular light intercepting member, that is in contact with the outer peripheral surface of the lens barrel, consists of a material containing fluorine.

16 Claims, 2 Drawing Sheets

LIGHT INTERCEPTING APPARATUS OF MOVABLE LENS BARREL

BACKGROUND OF THE INVENTION

1. Field of the Invention

The present invention is directed to a light intercepting apparatus for use in a lens barrel that is movable in an optical axis direction of a camera photographing lens.

2. Description of Related Art

Recently, many types of "zoom compact cameras" have been put on the market. Generally, a zoom compact camera has a movable lens barrel which is projected from and retracted into an opening formed in a front wall of a camera body. In order to achieve light interception around the movable lens barrel, an annular light intercepting member is ordinarily provided along the opening, and is brought into contact with an outer peripheral surface of the movable lens barrel in a slidable fashion. It is preferable that the annular light intercepting member is flexible and has the minimum frictional force necessary to adequately intercept light. Conventional annular light intercepting members are made of, for example, rubber, cloth, synthetic resin, felt, or brush, etc. However, these light intercepting members do not optimize the relationship between frictional force and light intercepting ability. For instance, in the case of a conventional annular light intercepting member made of rubber, the frictional force between the rubber intercepting member and the movable lens barrel is very large, resulting in an unnecessarily large burden on a motor used for moving the movable lens barrel. In the case of a conventional annular light intercepting member made of synthetic resin, it is often the case that scratches are made on the outer peripheral surface of the movable lens barrel. In the case of a conventional annular light intercepting member made of cloth or felt, a sufficient light intercepting effect cannot be obtained.

SUMMARY OF THE INVENTION

The primary object of the present invention is to provide a light intercepting apparatus for a movable lens barrel of a camera which minimizes friction at an outer peripheral surface of a movable lens barrel while having an excellent light intercepting ability.

To achieve the object mentioned above, according to the present invention, a light intercepting apparatus of a lens barrel is provided having a movable lens barrel that moves along an optical axis of the lens barrel, and, an annular light intercepting member in elastic contact with an outer peripheral surface of the movable lens barrel, wherein at least a portion of the annular light intercepting member in contact with the outer peripheral surface of the movable lens barrel consists of a material containing fluorine.

With this arrangement, since an annular light intercepting member in elastic contact with the outer peripheral surface of the movable lens barrel is made of a material containing fluorine, a light intercepting apparatus, that tightly contacts the movable lens barrel, has a high light intercepting ability and low frictional resistance can be realized.

According to a another aspect of the present invention, a light intercepting apparatus of a lens barrel integral with a camera, is provided. A camera body is provided with an opening formed in a front portion of the camera body. A movable lens barrel is movable along an optical axis of the lens barrel in the opening. An annular light intercepting mechanism is provided between the opening and an outer peripheral surface of the movable lens barrel. At least a portion of the annular light intercepting mechanism that is in contact with the outer peripheral surface of the movable lens barrel consists of a material to which fluorine is added.

According to a further aspect of the present invention, a light intercepting apparatus of a camera, having a movable lens barrel and an annular light intercepting member which is in slidable contact with an outer peripheral surface of the movable lens barrel, is provided. The annular light intercepting member includes an elastic member which exerts an elastic restoring force on the outer peripheral surface of the movable lens, a material containing fluorine that is provided at least on a portion of the elastic member in contact with the outer peripheral surface of the movable lens.

The present disclosure relates to subject matter contained in Japanese Utility Model Application No. 4-072728 HEI (filed on Oct. 19, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
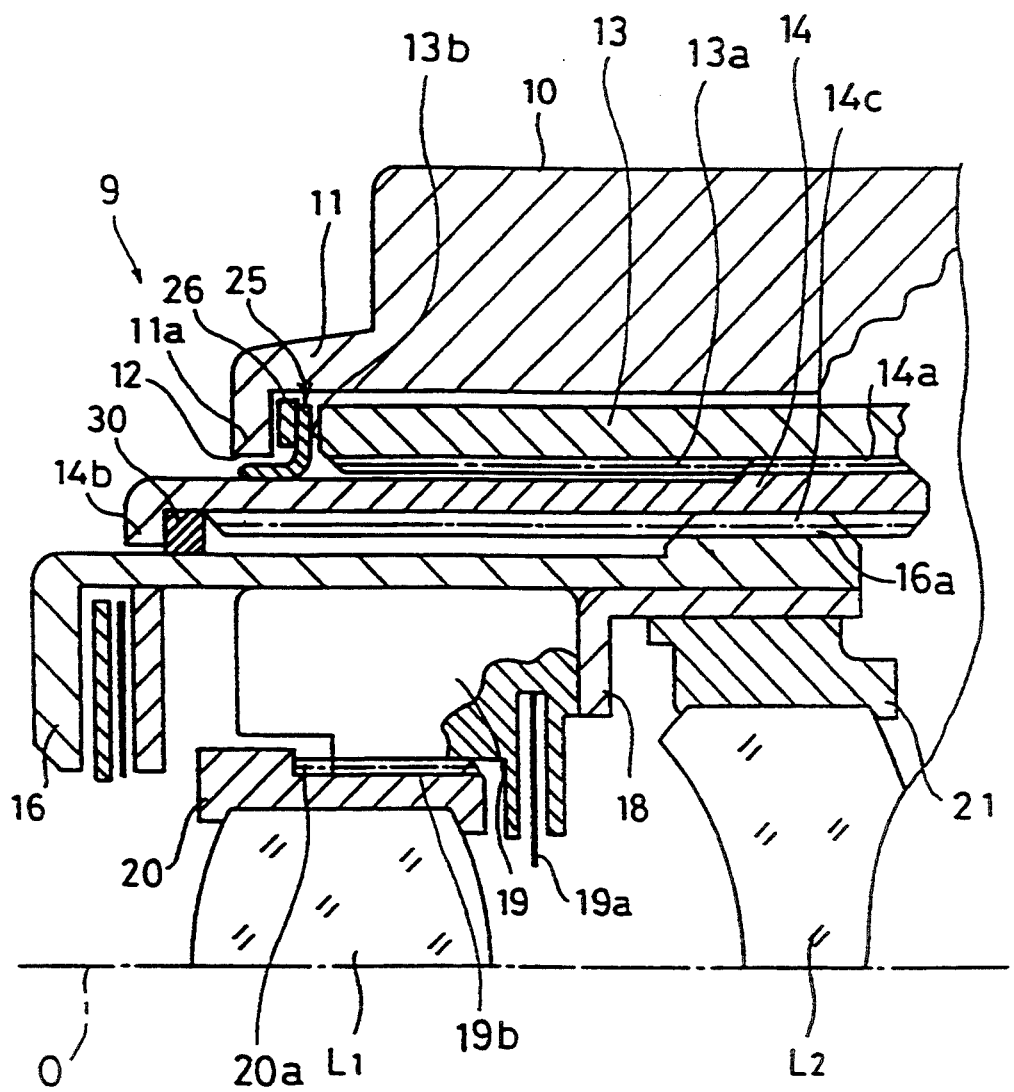
FIG. 1 is a longitudinal sectional view of an upper half of a zoom lens of a lens shutter type camera to which an annular light intercepting member is incorporated, according to the present invention.

FIG. 1 shows a longitudinal sectional view of an upper half of a zoom lens having a light intercepting apparatus along an optical axis of a lens barrel, according to the present invention.

A lens shutter type of camera has a camera body 10 and a zoom lens 9 integral therewith. The zoom lens 9 includes two lens assemblies, or groups, L (i.e. first and second lens assemblies L1 and L2).

A cover 11 of the camera body 10 is provided with an inner projecting flange 11a at the front edge thereof. The inner edge of the flange 11a defines an opening 12 in which a movable lens barrel (i.e., outer movable lens barrel) 14 moves forwardly and rearwardly along an optical axis O. A stationary barrel 13 is fixed inside the cover 11. A helicoid 13a is provided on the inner peripheral surface of the stationary barrel 13 and is engaged with a helicoid 14a formed on the rear outer peripheral surface of the movable lens barrel 14. A helicoid 14c is provided on the inner peripheral surface of the movable lens barrel 14 and is engaged with a helicoid 16a formed on the rear outer peripheral surface of a movable lens barrel (i.e., inner movable lens barrel) 16.

An AF/AE unit 19 is secured to the movable lens barrel 16 through a securing ring 18. A front holding frame 20, which holds the first lens assembly L1, is provided on the outer peripheral surface thereof with a helicoid 20a. The helicoid 20a is engaged with a helicoid 19b formed on the inner peripheral surface of the AF/AE unit 19. The AF/AE unit is a well-known device which moves the first lens assembly L1 along the optical axis O in accordance with a distance of an object to be photographed, and opens and closes shutter blades 19a according to a brightness of the object. A rear holding frame 21, which holds the second lens assembly L2, is itself held by the securing ring 18. The rear holding frame 21 is movable along the optical axis O with respect to the securing ring 18. The distance between the first lens assembly L1 and the second lens assembly L2 is varied during a zooming operation by the rotational movement of the movable lens barrel 14. Various types of zooming mechanisms, such as the one provided in the camera 10, are well known. Accordingly, details of the zooming mechanism are not provided herein, since the present invention is not directed to the zooming mechanism.

An annular light intercepting member 25 is provided between the inner projecting flange 11a and the front edge 13b of the stationary lens barrel 13. The annular light intercepting member 25 is for intercepting light at the opening between the outer peripheral surface of the movable lens barrel 14 and the inner surface or edge of the flange 11a. The annular light intercepting member 25 is fixed by an adhesive 27 to a ring-shaped base member 26 which is supported by the cover 11 behind the inner projecting flange 11a. The base member 26 is made of, for example, stainless steel, copper, or synthetic resin, and is positioned substantially normal to the direction of movement of the movable lens barrel 14.

The annular light intercepting member 25 consists of an elastic member 25a and a material containing fluorine 25b coated on the rear surface of the elastic member 25a. The annular light intercepting member 25 is bent with the fluorine-contained material 25b in slidable contact with the outer peripheral surface of the movable lens barrel 14. The elastic member 25a may be made of, for example, thin flexible reinforced plastic or rubber material which has the ability to intercept light. The fluorine-contained material 25b may be mixed with carbon or molybdenum or the like to increase its light intercepting ability.

Figure 2:
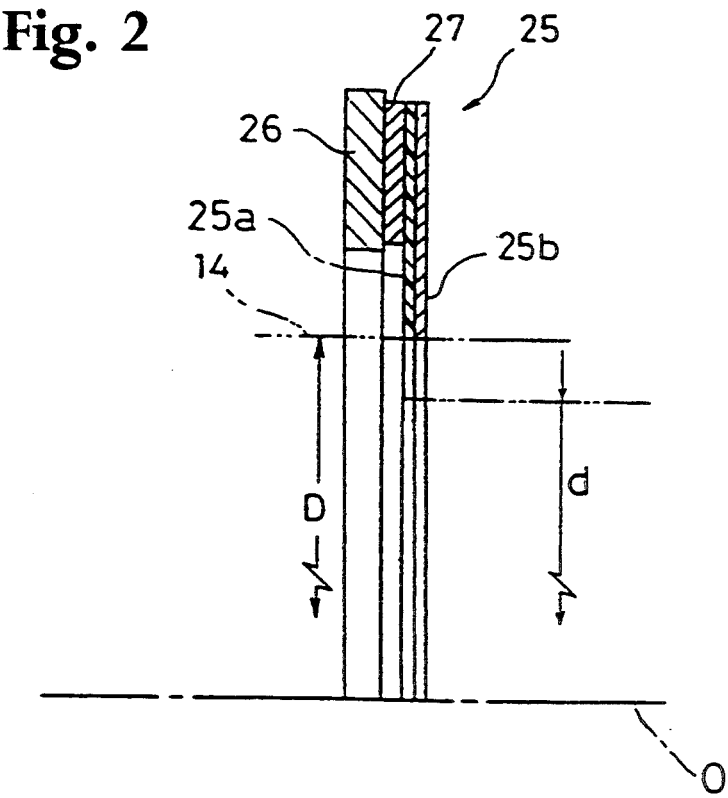
FIG. 2 is a longitudinal sectional view of an upper half of an annular light intercepting member in a free state, according to an embodiment of the present invention.

The annular light intercepting member 25 has a similar shape to the base member 26 when it is in a free state, as shown in FIG. 2. The inner diameter d of the annular light intercepting member 25, shown in FIG. 2, is made smaller than the outer diameter D of the movable lens barrel 14 in order for the annular light intercepting member 25 to be bent by substantially 90 degrees, as shown in FIG. 1, when the annular light intercepting member 25 is provided in place.

In the light intercepting apparatus of the present invention, the fluorine added material 25b comes into forcible contact with the outer peripheral surface of the movable lens barrel 14 by the restoring force of the elastic member 25a. In this state, when the movable lens barrel 14 moves forwardly and rearwardly in the opening 12 along the optical axis O, while rotating, the load on the motor (not shown) for rotating the movable lens barrel 14 is relatively small since the fluorine added material 25b has a low frictional resistance. Even if the elastic force of the elastic member 25a applied to the outer peripheral surface of the movable lens barrel 14 is relatively high so as to assure adequate light interception, the load on the motor would be small.

Figure 3:
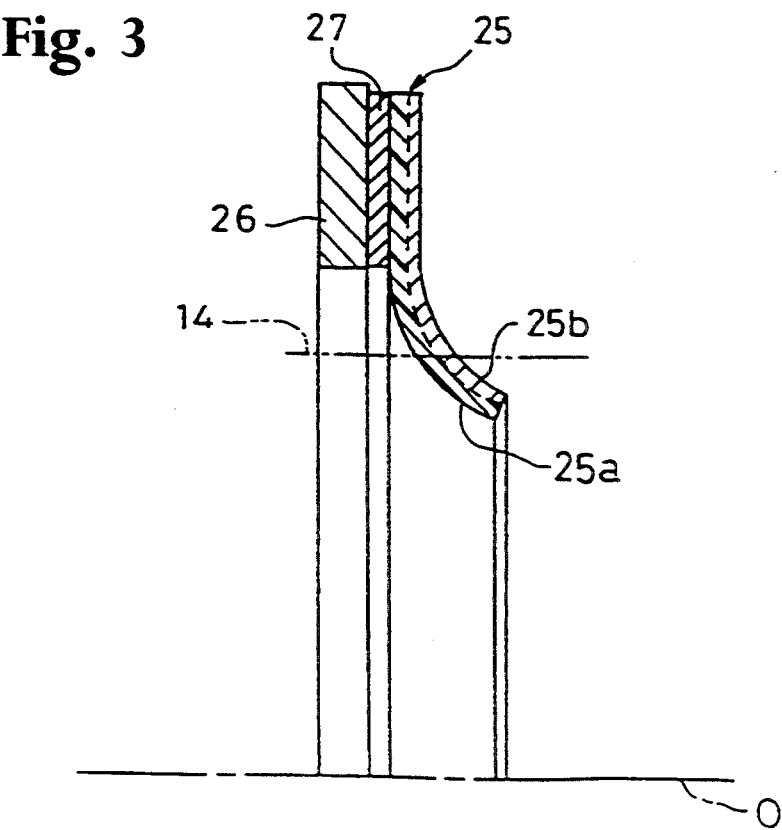
FIG. 3 is a longitudinal sectional view of an upper half of an annular light intercepting member in a free state, according to a second embodiment of the present invention.

The elastic member 25a may have a shape such as that shown in FIG. 3 in its free state. In this case, the elastic member 25a is curved with the side having the fluorine added material 25b on the inside of the curve, so that the adhesive force of the annular light intercepting member 25, applied to the outer peripheral surface of the movable lens barrel 14, is increased. According to this embodiment, when the annular light intercepting member 25 is provided in place, the annular light intercepting member 25 is bent in a direction opposite to the direction in which the elastic member is curved in its free state. Therefore, the fluorine added material 25b can be brought into contact with the outer periphery of the movable lens barrel 14, more tightly, without significantly increasing the load on the motor due to the low frictional characteristics of the fluorine added material 25b.

In the above embodiment, the fluorine added material 25b is coated on the elastic member 25a. However, it may be provided in the form of film which is adhered to the elastic member 25a.

The movable lens barrel 16, which is threadedly-engaged with the movable lens barrel 14 through the helicoids 13a and 14a, moves along the optical axis O following the rotation of the movable lens barrel 14. Hence, an annular light intercepting member 30, which is in slidable contact with the outer peripheral surface of the movable lens barrel 16, is provided behind the inner projecting flange 14b. The same structure as that of the annular light intercepting member 25 may be adapted to the annular light intercepting member 30.

Although the invention has been described with reference to particular means, materials and embodiments, it is to be understood that the invention is not limited to the particulars disclosed and extends to all equivalents within the scope of the claims.

I claim:

1. A light intercepting apparatus of a lens barrel, comprising:
   a movable lens barrel which moves along an optical axis of said lens barrel; and,
   annular light intercepting means, wherein a contacting portion of said annular light intercepting means is in elastic contact with an outer peripheral surface of said movable lens barrel, and wherein at least said contacting portion of said annular light intercepting means consists of a material containing fluorine, said annular light intercepting means comprising an elastic material and said fluorine containing material, wherein said elastic material and said fluorine containing material are adhered to each other.

2. The light intercepting apparatus of claim 1, wherein said annular light intercepting means has a front surface facing an object side of said lens barrel and a rear surface facing a rear side of said lens barrel.

3. The light intercepting apparatus of claim 2, wherein said elastic material is provided on said front surface and said fluorine containing material is provided on said rear surface.

4. The light intercepting apparatus of claim 3, wherein said elastic material is curved in a free state, and wherein said fluorine containing material is located on an inside of said curve.

5. The light intercepting apparatus of claim 1, wherein said annular light intercepting means has a front surface facing an object side of said lens barrel and a rear surface facing a rear side of said lens barrel.

6. The light intercepting apparatus of claim 5, wherein said elastic material is provided on said front surface and said fluorine containing material is provided on said rear surface.

7. The light intercepting apparatus of claim 6, wherein said elastic material is curved in a free state, and wherein said fluorine added material is located on an inside of said curve.

8. The light intercepting apparatus of claim 3, wherein said elastic material is made of a thin reinforced plastic material.

9. The light intercepting apparatus of claim 3, wherein said elastic material is made of a rubber material.

10. The light intercepting apparatus of claim 3, wherein said light intercepting apparatus further comprises:
a base means in a shape of a ring that is provided in said lens barrel and is formed substantially normal to a direction of movement of said movable lens barrel, wherein said annular light intercepting means is fixed to said base means.

11. The light intercepting apparatus of claim 10, wherein said annular light intercepting means is fixed to said base means by an adhesive.

12. The light intercepting apparatus of claim 6, wherein said elastic material is made of a thin reinforced plastic material.

13. The light intercepting apparatus of claim 6, wherein said elastic material is made of a rubber material.

14. The light intercepting apparatus of claim 6, wherein said light intercepting apparatus further comprises:
base means in a shape of a ring that is provided in said lens barrel and is formed substantially normal to a direction of movement of said movable lens barrel, wherein said annular light intercepting means is fixed to said base means.

15. The light intercepting apparatus of claim 14, wherein said annular light intercepting means is fixed to said base means by an adhesive.

16. A light intercepting apparatus of a lens barrel, comprising:
a movable lens barrel which moves along an optical axis of said lens barrel; and
annular light intercepting means, wherein a contacting portion of said annular light intercepting means is in elastic contact with an outer peripheral surface of said movable lens barrel, and wherein at least said contacting portion of said annular light intercepting means consists of a material containing fluorine, said light intercepting means is made of an elastic material with a coating of said fluorine containing material, said annular light intercepting means has a front surface facing an object side of said lens barrel and a rear surface facing a rear side of said lens barrel, said elastic material is provided on said front surface and said fluorine containing material is provided on said rear surface, said elastic material is curved in a free state and said fluorine containing material is located on an inside of said curve.

* * * * *

UNITED STATES PATENT AND TRADEMARK OFFICE
CERTIFICATE OF CORRECTION

PATENT NO. : 5,420,656
DATED : May 30, 1995
INVENTOR(S) : S. KOHMOTO

It is certified that error appears in the above-indentified patent and that said Letters Patent is hereby corrected as shown below:

At column 5, line 9 (claim 7, line 3), change "added" to ---containing---.
At column 5, line 20 (claim 10, line 4), delete "a" (first occurrence).

Signed and Sealed this

Twelfth Day of March, 1996

BRUCE LEHMAN

Attest:

*Attesting Officer*    *Commissioner of Patents and Trademarks*